United States Patent [19]

Isobe et al.

[11] Patent Number: 5,586,096
[45] Date of Patent: Dec. 17, 1996

[54] OPTICAL WRITE/READ DEVICE AND AN INFORMATION RECORDING MEDIA

[75] Inventors: Minoru Isobe; Yukio Nakamura, both of Tokyo, Japan

[73] Assignee: Oki Electric Industry Co., Ltd., Tokyo, Japan

[21] Appl. No.: 508,514

[22] Filed: Jul. 28, 1995

[30] Foreign Application Priority Data

Aug. 1, 1994 [JP] Japan ..................... 6-180301

[51] Int. Cl.$^6$ ....................................... G11B 7/00
[52] U.S. Cl. ................ 369/102; 369/48; 369/109; 369/94; 369/44.38; 359/15; 359/566; 359/569
[58] Field of Search ......................... 369/102, 109, 369/103, 48, 46, 120, 124, 94, 44.37, 44.38; 250/208.1, 578.1; 359/15, 566, 569

[56] References Cited

U.S. PATENT DOCUMENTS

| | | | |
|---|---|---|---|
| 4,598,393 | 7/1986 | Pierce et al. | 369/44.38 |
| 4,787,075 | 11/1988 | Matsuoka et al. | 369/44.38 |
| 4,908,813 | 3/1990 | Ojima et al. | 369/94 |
| 5,181,161 | 1/1993 | Hirose et al. | 369/48 |
| 5,233,444 | 8/1993 | Musha et al. | 359/15 |
| 5,386,410 | 1/1995 | Nagasaki et al. | 369/109 |

OTHER PUBLICATIONS

Maruzen Kabushiki Kaisha, "Optical Disk Memory", *Recording and Memory Technology Handbook*, Chapter 15, pp. 517–553, Aug. 25, 1992 (In Japanese with English translation provided).

*Primary Examiner*—Loha Ben
*Attorney, Agent, or Firm*—Panitch Schwarze Jacobs & Nadel, P.C.

[57] ABSTRACT

The present invention comprises an optical write/read device including a light emitting/receiving portion having light emitting elements and light receiving elements which are arranged in parallel with one another, and a simple optical system. In the optical system, light emitted from the light emitting element is lead to an information recording medium, and light reflected on the information recording medium among lights emitted from the light emitting elements is lead to the light receiving element. Accordingly, the light emitting element can be used as a recording light source and a reading light source, and further the light receiving elements arranged in parallel with the light emitting elements can be used as an optical detector. The information recording medium employed by the optical write/read device includes a column of positional aligning marks.

16 Claims, 6 Drawing Sheets

OPTICAL WRITE/READ DEVICE AND AN INFORMATION RECORDING MEDIA

REFERENCE TO RELATED APPLICATION

This application claims the priority right under 35 U.S. C 119. of Japanese Patent Application No. Hei 06-180301 filed on Aug. 01, 1995, the entire disclosure of which is incorporated herein by reference.

BACKGROUND OF THE INVENTION

1. Field of the Invention

The present invention relates to an optical write/read device capable of corresponding to an optical card or an optical disc and an information recording medium adapted for use in the optical write/read device.

2. Description of the Related Art

Recently, a medium for recording information therein using light represented by an optical card or optical disk has been noticed. An optical write/read device for writing information in and/or reading information from such medium comprises an optical head for use in writing/reading information and a moving mechanism for moving the optical head to a given position. There are various types of optical head such as a read-only type, a write-once type, an erasable magnet-optical type, wherein any type of the optical head includes fundamentally a light source, lenses and an optical detector (detector optical system).

However, the prior art optical write/read device has such an arrangement that an optical head having a single light source is moved at high speed by a moving mechanism along a plurality of tracks of an information recording medium, which are arranged in a width direction of the same medium, so as to record information in or read information from the medium. Accordingly, there have been needed (a) a complex detector optical system, and (b) a moving mechanism capable of moving an optical head in full width of the medium and also moving the optical head precisely along a desired track of the medium by way of a feedback control of the detector optical system, so that the optical head can be moved precisely along the desired track of the medium. Further, in the prior art optical write/read device, a recording optical system and a reading optical system must be individually provided. Accordingly, the optical write/read device has been complex and high-priced.

SUMMARY OF THE INVENTION

It is an object of the invention to provide an optical write/read device including an optical head provided for a plurality of tracks of an information recording medium and capable of easily performing positional alignment of the optical head with respect to the information recording medium, and also capable of writing information in and reading information from the information recording medium, and the information recording medium adapted for use in the optical write/read device.

To achieve the above object, the optical write/read device comprises an optical head for reading information in and/or writing information from an information recording medium, wherein the optical head comprises a light emitting/receiving portion comprising a light emitting element array arranged in one direction and comprising a plurality of light emitting elements and a light receiving element array arranged in parallel with the light emitting element array and comprising a plurality of light receiving elements corresponding to the plurality of light emitting elements, and an optical system for leading light emitted from the light emitting elements to the information recording medium, and leading light reflected on the information recording medium among lights emitted from the light emitting elements to the light receiving elements.

The information recording medium according to the present invention is adapted for use in the optical write/read device. That is, the information recording medium includes at least one positional aligning mark for positioning the information recording medium with respect to the optical head and at least one positional aligning mark column comprising a plurality of positional aligning marks arranged in a given pitch.

According to the optical write/read device of the present invention, the optical head is structured by the light emitting/receiving portion comprising the light emitting element column and the light receiving element column which are arranged in parallel with each other. Since the optical head includes a given optical system, light emitted from a light emitting element can be lead to a given portion of the information recording medium and light reflected on the information recording medium can be lead to a light receiving element close to the light emitting element. Accordingly, it is possible to obtain an optical head comprising a plurality of optical head units arranged in an array. This means that an optical head unit can be prepared for each track of the information recording medium.

Further, according to the information recording medium of the invention, since the positional aligning mark is detected by the optical head provided in the optical write/read device, the information recording medium and the optical write/read device can easily establish a given positional relation.

DETAILED DESCRIPTION OF THE PREFERRED EMBODIMENT

An optical write/read device and an information recording media according to a preferred embodiment will be now described with reference to attached drawings. The attached drawings schematically show dimensions and shapes of each component and positional relationship therebetween to such an extent that the invention can be understood. The same components are denoted at the same numerals in each drawing.

1 Explanation of the Optical Write/Read Device

Figure 1:
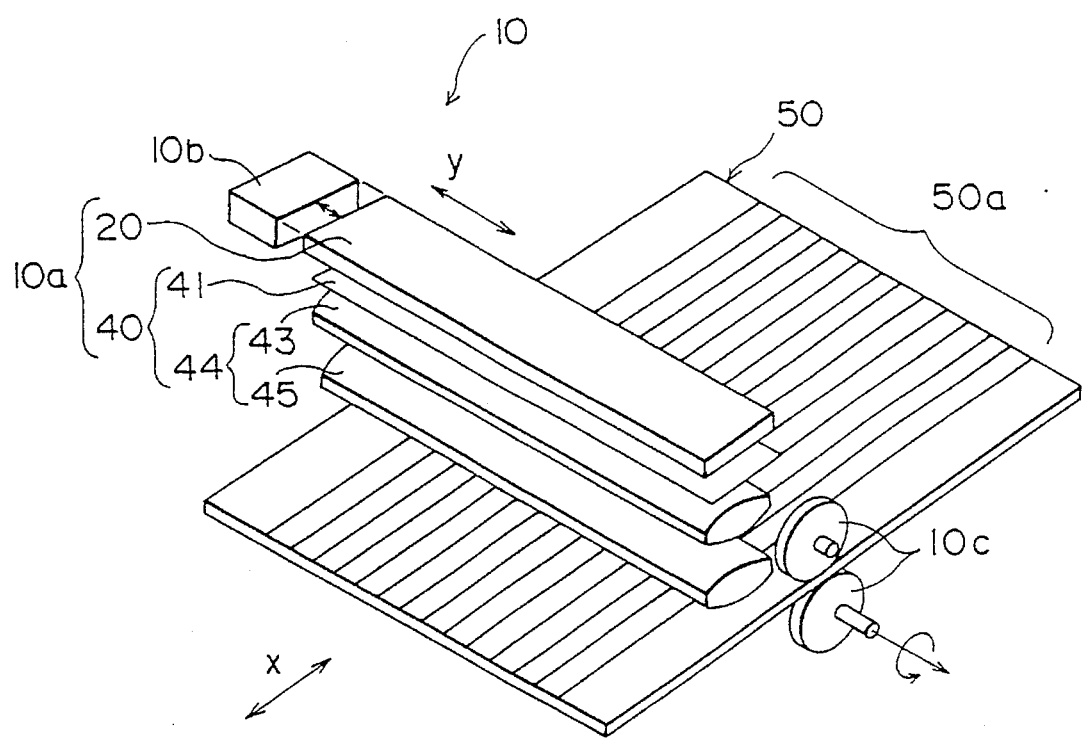
FIG. 1 is a perspective view of an optical write/read device according to a preferred embodiment of the invention.

An arrangement of the optical write/read device is first described. FIG. 1 is a perspective view showing an optical write/read device 10 together with an information recording medium 50. The optical write/read device 10 in FIG. 1 comprises an optical head 10a, a head moving mechanism 10b and a medium feeding mechanism 10c. The optical head 10a comprises a light/receiving portion 20 having a light emitting element array 23 and a light receiving element array 25, etc. and an optical system 40, described later. The head moving mechanism 10b is a mechanism for moving the optical head 10a for a given distance in a given direction. The medium feeding mechanism 10c is a mechanism for moving the information recording medium 50 with respect to the optical head 10a in a given direction.

Figure 2:
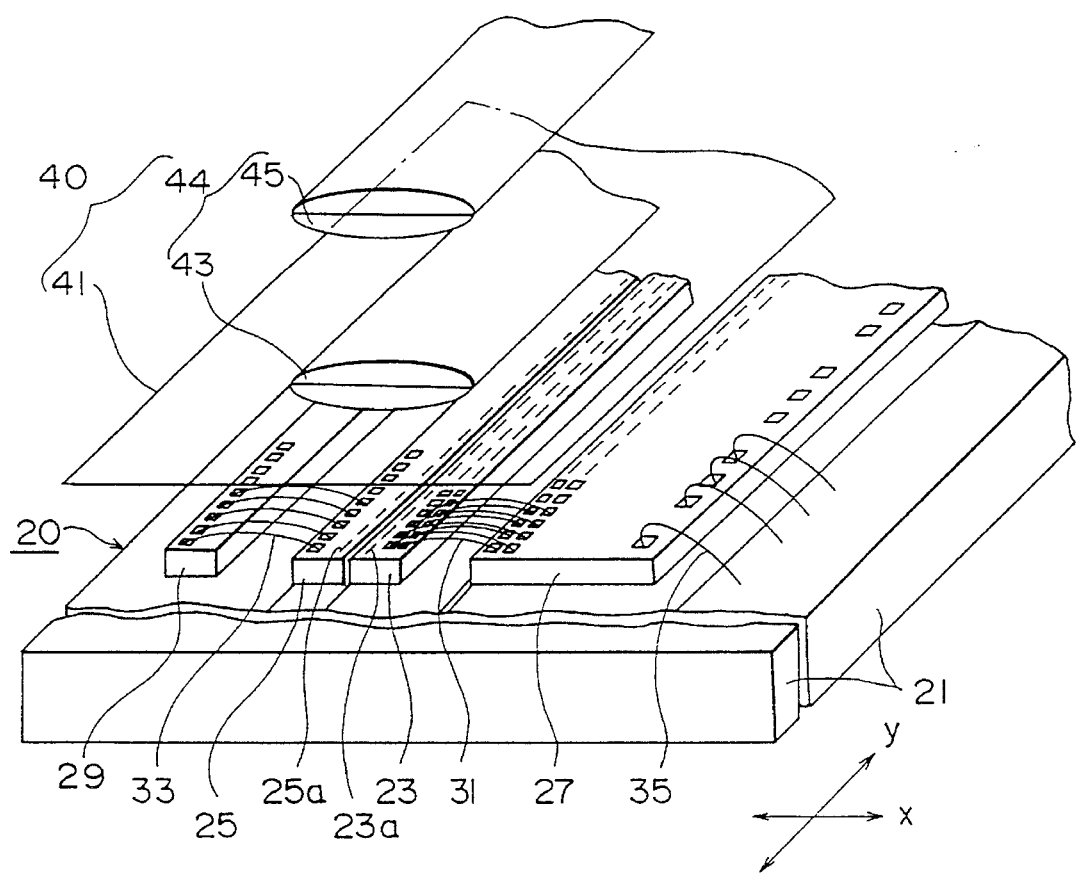
FIG. 2 is a perspective view showing a concrete structure of an optical head of the optical write/read device in FIG. 1.

The optical head 10a of this embodiment will be firstly described. FIG. 2 is an enlarged perspective view of a main portion of the optical head 10a, the main portion being shown upside down. In FIG. 2, the optical head 10a comprises the light emitting/receiving portion 20 and the optical system 40 as mentioned above.

The light emitting/receiving portion 20 comprises a wiring substrate 21, the light emitting element array 23, the light receiving element array 25, a light emitting element array driving circuit (hereinafter referred to as a driving circuit) 27, and an amplifier 29 for use in the light receiving element array (hereinafter referred to as an amplifier 29). The light receiving element array 25 corresponds to the light emitting element array 23 and is arranged in parallel with the light emitting element array 23. The driving circuit 27 is a circuit for driving the light emitting element array 23. The amplifier 29 is an amplifier for amplifying an output of the light receiving element array 25. The light emitting element array 23 and the driving circuit 27 are electrically connected to each other by an arbitrary suitable connecting means 31 (wires in FIG. 2). The driving circuit 27 and the wiring substrate 21 are electrically connected to each other by an arbitrary suitable connecting means 35 (wires in FIG. 2). The light receiving element array 25 and the amplifier 29 are electrically connected to each other by an arbitrary suitable connecting means 33 (wires in FIG. 2).

The light emitting element array 23 in the light emitting/receiving portion 20 comprises a plurality of light emitting elements 23a arranged linearly in a given pitch. The given pitch corresponds to a track pitch to be formed on the information recording medium 50, a track pitch already formed on the information recording medium 50, a track pitch standardized in accordance with a write/read system or the like. The light emitting element array 23 has a length covering at least a full width of a recording portion 50a (refer to FIG. 1) of the information recording medium 50. If one light emitting element array 23 can not cover the full width of the recording portion 50a, the light emitting element arrays 23 may be arranged linearly as many as necessary for covering the full width of the recording portion 50a.

Each of the light emitting elements 23a constituting the light emitting element array 23 is preferable to be formed of an element capable of emitting light having a single wavelength such as a semiconductor laser, a light emitting diode, and an electroluminescent element. If each of the light emitting elements 23a is formed of a light source incapable of emitting light having a single wavelength such as a plasma radiation, a fluorescent electron tube or the like, it is preferable to use a wavelength selecting means such as a wavelength filter together therewith. If the light having the single wavelength is used, the following advantages can be obtained. For example, (a) writing information in or reading information from the information recording medium 50 can be easily controlled, (b) the optical system 40 described later can be easily designed, etc.

The light receiving element array 25 in the light emitting/receiving portion 20 comprises a plurality of light receiving elements 25a which are the same in number and pitch as the light emitting elements 23a of the light emitting element array 23. The light receiving element array 25 is arranged on the wiring substrate 21 so that one of the light receiving elements 25a is positioned close to one of the light emitting elements 23a, namely, each of the light receiving elements 25a is paired with each of the light emitting elements 23a.

Each of the light receiving element 25a constituting the light receiving element array 25 can be formed of an arbitrary suitable element, e.g. an optical conductive material such as cadmium sulfide, selenium, zinc oxide, or a photodiode such as a pn diode, a pin diode, a metal-semiconductor diode, or a phototransistor having an npn or a pnp junction.

The light emitting element array 23 and the light receiving element array 25 are arranged in a direction which crosses with directions of the tracks (hereinafter referred to as track direction) of the information recording medium 50, which means typically a direction crossing at right angles with the track direction of the information recording medium 50. It is a matter of course that the columns of the light emitting element array 23 and the light receiving element array 25 may cross at some angles (other than right angles) with the track direction.

The optical system 40 will be next described. The optical system 40 leads light from the light emitting element 23a to the information recording medium 50 and leads the light reflected on the information recording medium 50 among the lights from the light emitting elements 23a to the light receiving element 25a corresponding to the light emitting element 23a. As shown in FIG. 2, the optical system 40 comprises a diffraction grating 41 and a collimetor lens 44, which are arranged in the order of the light emitting/receiving portion 20, the diffraction grating 41 and the collimator lens 44. The diffraction grating 41 is a general type grating having concave and convex lines arranged in a given pitch. The collimator lens 44 is composed of a first cylindrical lens 43 and a second cylindrical lens 45, the longitudinal axes thereof being arranged in parallel with the arranging directions of the light emitting elements 23a and the light receiving elements 25a.

Figure 3:
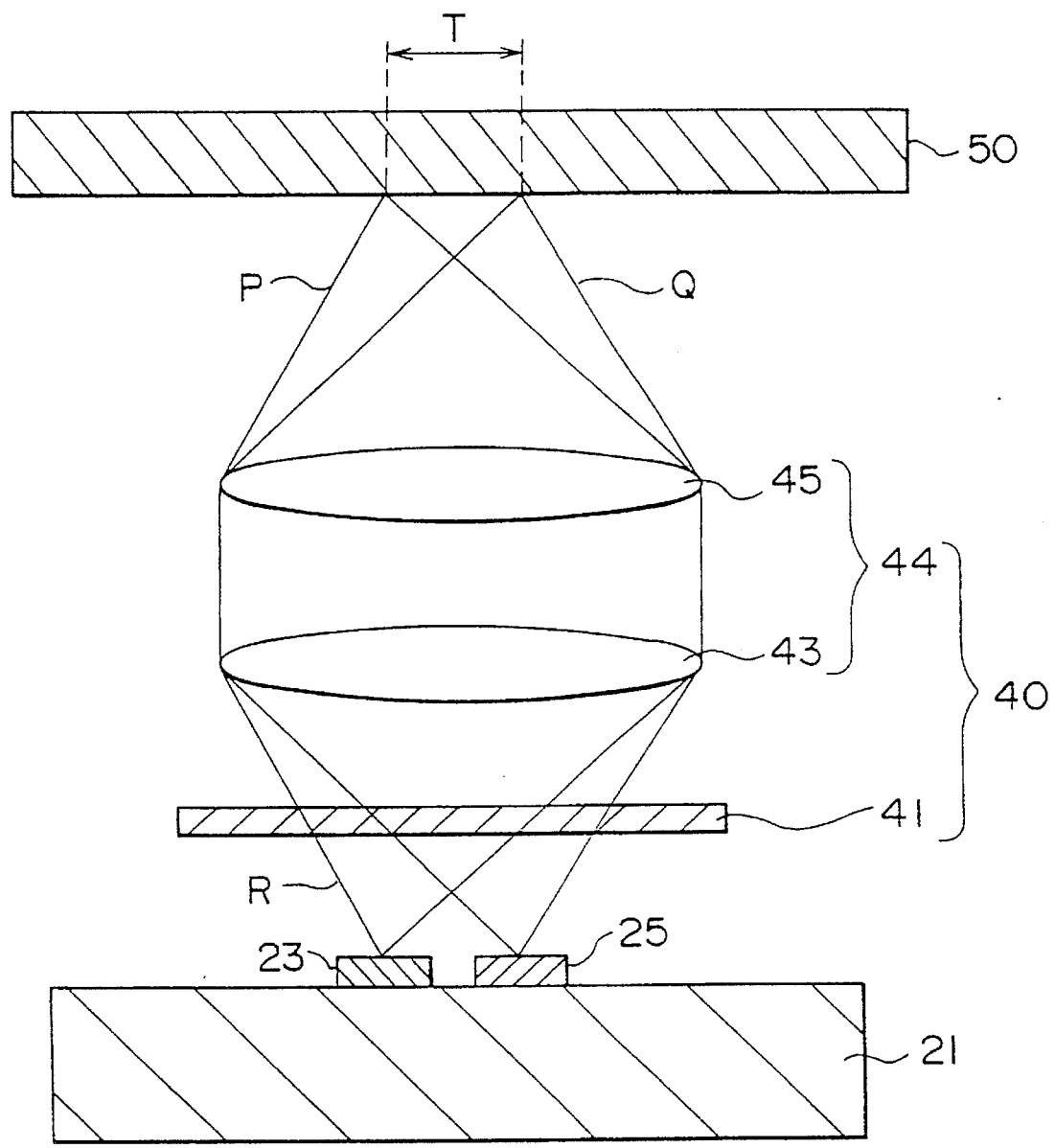
FIG. 3 is a view for explaining an optical system of the optical head in FIG. 2.

The diffraction grating 41 has a function to split the light emitted from the light emitting element array 23 into a zero-order diffracted light and a first-order diffracted light. FIG. 3 is a view typically showing the zero-order diffracted light and the first-order diffracted light in the optical system 40. In FIG. 3, denoted at P is the zero-order diffracted light, Q is a first-order diffracted light and R is the first-order diffracted light Q reflected on the information recording medium 50. T is a distance between a position on which the zero-order diffracted light P focuses and a position on which the first-order diffracted light Q focuses. As is evident from FIG. 3, according to the optical system 40 having the elements of this preferred embodiment, light emitted from the light emitting element array 23 is split into the zero-order diffracted light P and the first-order diffracted light Q and is lead to the information recording medium 50, and light reflected on the information recording medium 50 among the lights emitted from the light emitting elements 23a in FIG. 2 can be lead to the light receiving element 25a corresponding to the light emitting element 23a as a reflected light of the first-order diffracted light Q.

The optical system 40 can be assembled by the diffraction grating 41 and the collimator lens 44 comprising the first cylindrical lens 43 and the second cylindrical lens 45 without adjusting the first cylindrical lens 43 and second cylindrical lens 45 since the longitudinal axis of the collimator lens 44 is arranged in parallel with the longitudinal axes, i.e., arranging direction of the light emitting element 23a and light receiving element 25a of the light emitting/receiving portion 20. Accordingly, the optical head 10a can be miniaturized and simplified.

The optical system 40 is not limited to the aforementioned structure. For example, the diffraction grating 41 may be replaced by a prism which leads the light emitted from the light emitting element array 23 to the information recording medium 50 and also leads the light reflected on the information recording medium 50 among the lights emitted from the light emitting elements 23a to the light receiving element 25a corresponding to the light emitting element 23a. The collimator lens 44 may be replaced by a convergent rod lens array.

The head moving mechanism 10b and the medium feeding mechanism 10c will be now described in detail with reference to FIG. 1.

The head moving mechanism 10b has a function to move at least the light emitting/receiving portion 20 of the optical write/read device 10 in the direction of an arrow y (hereinafter referred to as a y direction) within the pitch of the light emitting elements 23a so as to correctly position the optical head 10a with respect to tracks of the information recording medium 50 if the optical head units having one to one positional correspondence to their corresponding tracks get out of position.

A mechanism and control of the head moving mechanism 10b can be more simplified than those of the prior art head moving mechanism since a moving distance of the head moving mechanism 10b is small, namely, it is within the arranged pitch of the light emitting elements 23a. A structure of the head moving mechanism 10b is not specifically limited. For example, a feeding mechanism including a piezoelectric element can be used as the head moving mechanism 10b. The head moving mechanism 10b may move the entire optical head.

The medium feeding mechanism 10c feeds the information recording medium 50 in a direction of an arrow x (hereinafter referred to as an x direction) with accuracy. A structure of the medium feeding mechanism 10c is not specifically limited. For example, a platen can be used as the medium feeding mechanism 10c. The medium feeding mechanism 10c may be provided independently of the optical write/read device 10.

The head moving mechanism 10b and the medium feeding mechanism 10c are arranged in such a manner that the y direction in which the light emitting/receiving portion 20 is moved by the head moving mechanism 10b crosses with the x direction in which the information recording medium 50 is moved by the medium feeding mechanism 10c.

2. Explanation of the Information Recording Medium 50

Figure 4A:
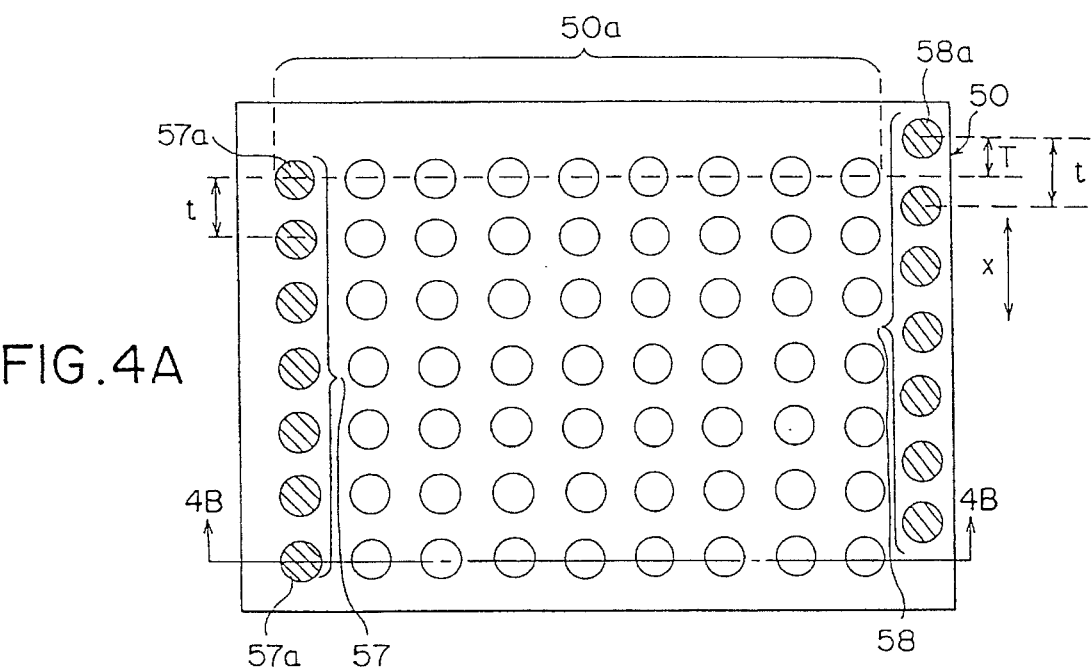
FIG. 4A and 4B are views for explaining an information recording medium adapted for use in the optical write/read device in FIG. 1.
Figure 4B:
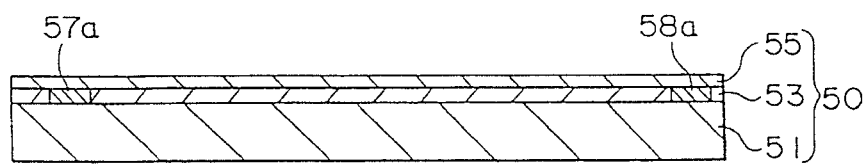

The information recording medium 50 will be now described. FIG. 4A is a plan view of the information recording medium 50 and FIG. 4B is a cross-sectional view taken along lines 4B–4B of FIG. 4A. As shown in FIG. 4B, the information recording medium 50 comprises a supporting body 51, and a recording layer 53 and a protecting layer 55 which are layered one on another in the top-to-bottom order. As shown in FIG. 4A, the information recording medium 50 has at least one positioning mark column 57 comprising a plurality of positioning marks 57a which are arranged in a given pitch t for positionally aligning the information recording medium 50 with respect to the optical write/read device 10 along a direction of each track of the information recording medium 50 (along the direction in which the information recording medium 50 is fed by the medium feeding mechanism 10c, i.e., the x direction in FIGS. 1 and 4). Particularly, according to this preferred embodiment, the positioning mark column 57 and a positioning mark column 58 are provided at both ends of the recording portion 50a of the information recording medium 50 in the width direction thereof, which enables the information recording medium 50 to record information on the main surface thereof. Each of the positioning marks 57a is displaced from each of the positioning marks 58a by a distance T in the x direction. The distance T is ideal to be one half of the given pitch t.

The positioning mark 57a and the positioning mark 58a may have various structures. In the preferred embodiment, they are formed of black spots capable of strongly absorbing the light emitted from the light emitting element array 23. These positioning marks are formed in advance by various methods corresponding to the arrangement of the information recording medium 50 such as an offset printing, a photographic or a thermal method. The pitch t of the positioning marks 57a or the positioning marks 58a is somewhat related to a pitch of the rows of recording bit positions (same pitch in this embodiment).

Concretely, the information recording medium 50 is formed of a photosensitive paper represented by a silver film, a thermosensitive paper using Crystal Violet Lactone, triphenylmethane, or fluoran as a color developer, a thermal paper on which molten resin or polymerized capsule is applied, an organic medium film such as a tellurium medium film, an amorphous medium film, or a cyanine medium film, a magnet-optical medium film or a phase change medium film.

The supporting body 51 is formed of various materials such as inorganic material or plastics depending on a design thereof. The supporting body 51 may be formed of paper for reduction of cost of the information recording medium 50, if need be. The protecting layer 55 is also formed of various materials such as inorganic material, plastic (e.g., polyester) depending on a design thereof. It is a matter of course that the protecting layer 55 is not an indispensable element.

If the information recording medium 50 is intended to be used exclusively for reading information, it may comprise the supporting body 51 formed of a low priced sheet such as paper, and the positioning mark columns 57 and 58 and the information per se are respectively formed by printing such as an offset printing, a relief printing or a screen printing. As a result, it is possible to form the low priced information recording medium 50.

Structures of the positioning marks 57a and 58a are not limited to those as mentioned above. For example, a black belt-shaped region is formed in a region where the positioning mark columns 57 and 58 are to be formed and it is left white at positions corresponding to the positioning marks 57a and 58a to thereby form white marks, namely, the positioning marks 57a and 58a may be formed of white spots contrary to the black spots in the preferred embodiment.

3. Explanation of Operation

Figure 5:
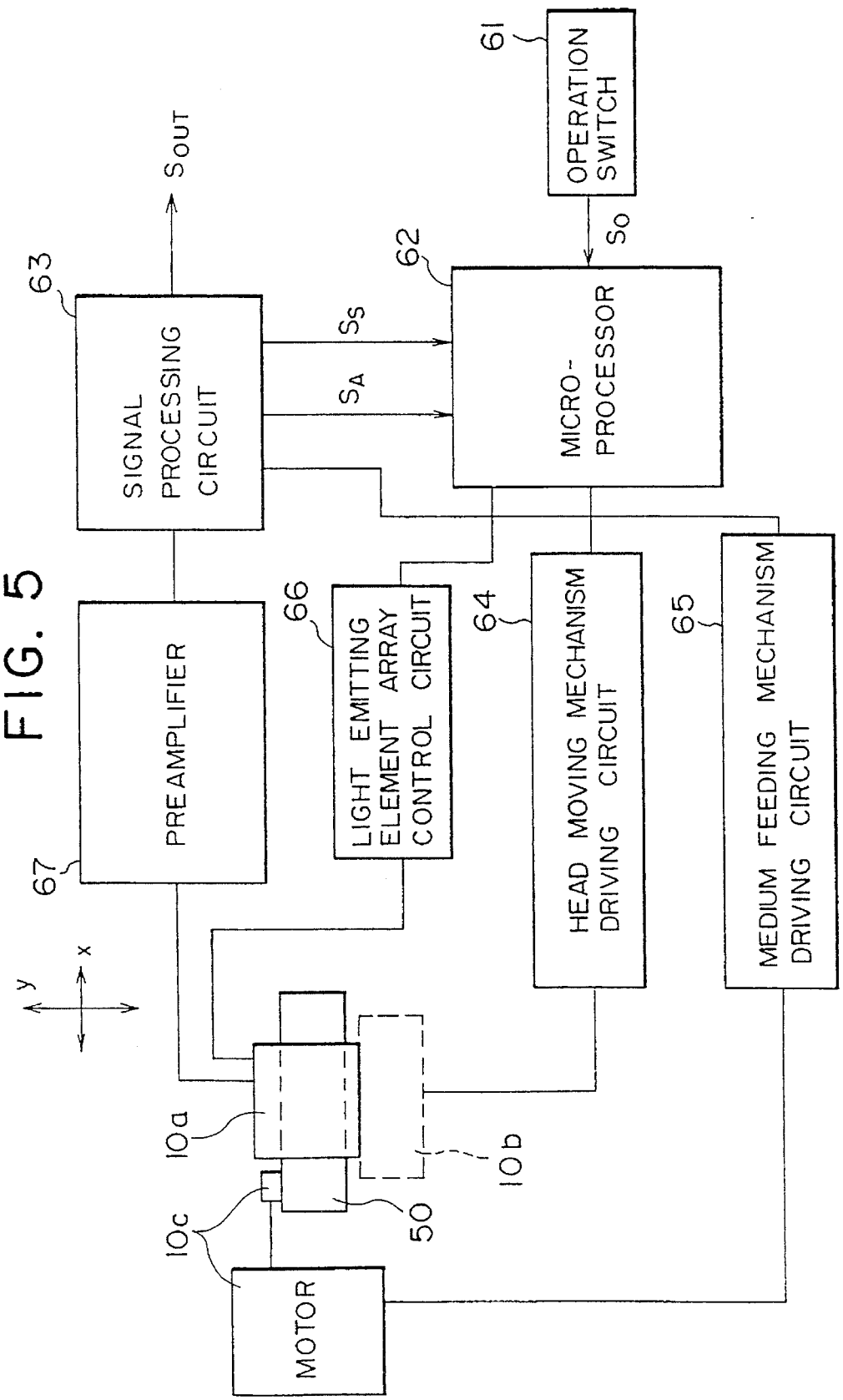
FIG. 5 is a block diagram showing a control system of the optical write/read device in FIG. 1.
Figure 6A:
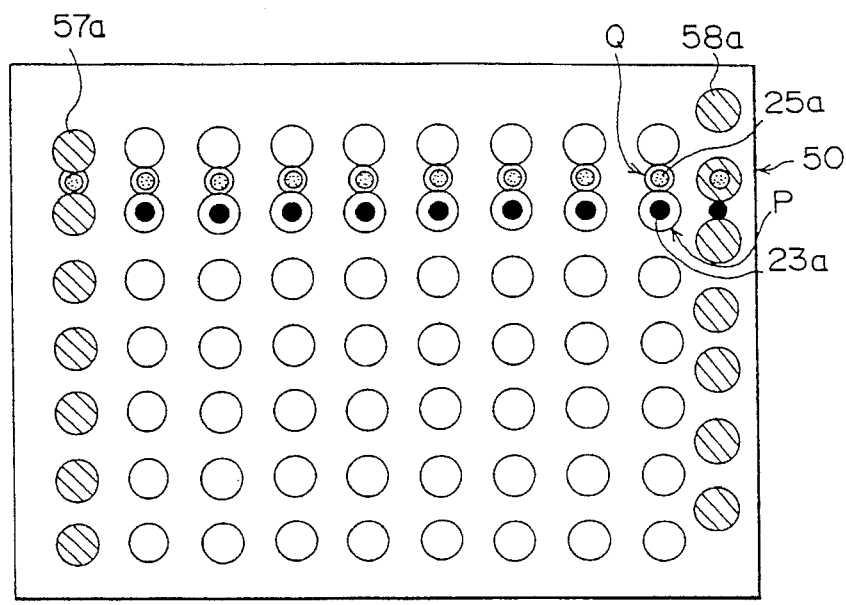
FIG. 6A is a view for explaining a recording operation of the optical write/read device in FIG. 1.
Figure 6B:
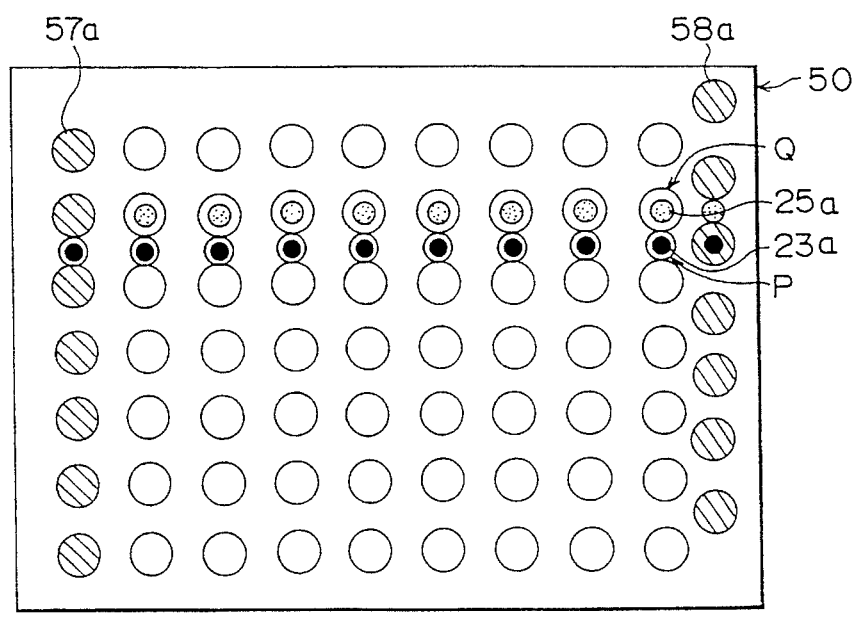
FIG. 6B is a view for explaining a reading operation of the optical write/read device in FIG. 1.

An operation to record information in the information recording medium 50 and an operation to read information from the information recording medium 50 using the optical write/read device 10 will be now described with reference to mainly FIGS. 2, 3, 5 and 6. FIG. 5 is a view showing an arrangement of a control portion in the optical write/read device 10, FIG. 6A is a view explaining an operation to write information in the information recording medium 50 and FIG. 6B is a view explaining an operation to read information from the information recording medium 50.

3-1 Positional Alignment between the Optical Write/Read Device 10 and the Information Recording Medium 50

First, the positional alignment between the optical write/read device 10 and the information recording medium 50 will be now described. In FIG. 5, a start signal $S_0$ is supplied from an operation switch 61 to a microprocessor 62. The microprocessor 62 issues, upon reception of the start signal $S_o$, a signal to allow the both endmost light emitting elements of the light emitting/receiving portion 20 in the optical head 10a (refer to FIG. 2) to emit light, namely, to allow light emitting elements corresponding to the positioning mark columns 57 and 58 of the information recording medium 50 (refer to FIG. 4) to emit light, the issued signal being supplied from the microprocessor 62 to the driving circuit 27 (refer to FIG. 2) by way of a light emitting element array control circuit 66. The light emitting elements corresponding to the positioning mark columns 57 and 58 of the information recording medium 50 emit light upon reception of the signal from the driving circuit 27. The emitted light is split into the zero-order diffracted light P and the first-order diffracted light Q by the diffraction grating 41 (refer to FIG. 3) in the optical head 10a, and the split light is focused by the collimator lens 44 into a zero-order diffracted image and a first-order diffracted image on portions close to the positioning mark columns 57 and 58 of the information recording medium 50. The first-order diffracted light Q thus focused into the image is reflected on the information recording medium 50, as explained with reference to FIG. 3, and the thus reflected light reaches the light receiving element array 25, namely, reach the light receiving elements at one end of the light receiving element array 25 (light receiving element paired with the light emitted light emitting element). The light received by the light receiving elements are subjected to a light-electricity conversion and changed into an electric signal by the light receiving elements. This electric signal is passed through the light receiving element array amplifier 29 in FIG. 2, a preamplifier 67 and a signal processing unit 63 in FIG. 5 and is fed back to the microprocessor 62 as a control signal $S_s$. Amount of reflected light of the first-order diffracted light Q on the information recording medium 50 is differentiated depending on whether first-order diffracted light image is focused on a portion where the positioning mark columns 57 and 58 of the information recording medium 50 exist or not exist. That is, when the first-order diffracted light Q focuses on the portion where the positioning mark columns 57 and 58 exist, the amount of reflected light becomes the smallest. The microprocessor 62 operates the head moving mechanism 10b by way of a head moving mechanism driving circuit 64 so that the control signal $S_s$ may be minimum with reference to the electric signal of the light receiving element array 25 corresponding to the positioning mark 58a in case of recording operation, described later, or with reference to the electric signal of the light receiving element array 25 corresponding to the positioning mark 57a in case of reading operation so as to move the optical write/read device 10 by the head moving mechanism 10b in the y direction in FIG. 1. With such a series of operations, the light emitting elements and the positioning mark columns are aligned with each other in the width direction of the information recording medium 50.

Successively, the microprocessor 62 supplies a signal to the medium feeding mechanism 10c by way of a medium feeding mechanism driving circuit 65 (refer to FIG. 5) so that a motor of the medium feeding mechanism 10c drives, e.g. a platen to feed the information recording medium 50 in the x direction in FIG. 1. At this time, the medium feeding mechanism driving circuit 65 controls the medium feeding mechanism 10c in a manner similar to the positional alignment in the y direction, namely, so as to permit the amount of reflected light of the first-order diffracted light Q to be the smallest. With such a series of operations, the light emitting elements and the positioning mark columns are aligned with each other respectively in their positions in the track direction of the information recording medium 50.

Intensity of the light emitting elements 23a in case of positional alignment in both directions is made substantially half of that in case of writing operation, described later. Accordingly, information is never written in the information recording medium 50 by light emitted from the light emitting elements 23a at the time of positional aligning operation.

Although the positioning mark columns are provided at both ends of the information recording medium 50 in the preferred embodiment, even if they are provided at one end of the information recording medium 50, the light emitting element and the positioning mark column can be aligned with each other in their positions in the width direction of the information recording medium 50. That is, if the position where the control signal $S_s$ becomes the minimum is not found even if the light emitting/receiving portion 20 is moved by the head moving mechanism 10b in the width direction of the information recording medium 50, it is preferable to permit the medium feeding mechanism 10c to feed the information recording medium 50 minutely (t/2 at the maximum) in the track direction of the information recording medium 50 and then to permit the medium feeding mechanism 10c to find out the position where the control signal $S_s$ becomes the minimum.

Upon completion of such a positional alignment, the information is recorded and read in the following manner.

3-2 Recording Operation

First, the recording operation of the information is performed as follows. In the recording operation, positional relation between the information recording medium 50 and the optical head 10a is controlled so that the first-order diffracted light Q remitted from the light emitting element is focused into the image on the positioning mark 58a of the information recording medium 50. The positional relation control can be performed in the aforementioned 3-1 procedure. The signal processing unit 63 outputs an address signal $S_A$ corresponding to a desired recording to the microprocessor 62. The microprocessor 62 supplies a light emitting timing signal and a recorded information to the light emitting element array control circuit 66 in response to the address signal $S_A$. The light emitting element array control circuit 66 supplies, upon reception of these signals, the light emitting timing signal, the recorded information and a driving power source to the driving circuit 27 (refer to FIG. 2). The driving circuit 27 supplies, upon reception of these signals, a current as a light emitting signal to each light emitting element other than the endmost light emitting elements of the light emitting element array 23 in the optical head 10a. Such light emitting element emits light in response to the recorded information. The thus emitted light is split into the zero-order diffracted light P and the first-order diffracted light Q by the diffraction grating 41 as explained with reference to FIG. 3, and the split zero diffracted light P and first-order diffracted light Q pass through the collimator lens 44 and they are focused into the image on a position close to the record bit of the information recording medium 50 as the zero-order diffracted image and the first-order diffracted image. This is illustrated in FIG. 6A, which exemplifies a case where all light emitting elements 23a in one line emitted light. Each relation between the light emitting element 23a, the light receiving element 25a, and the zero-order diffracted light P and the first-order diffracted light Q based on the light emitting element can be understood from FIG. 6A. Information is recorded on the information recording medium 50 by the zero-order diffracted light P. That is, if the information recording medium 50 has the silver film as the recording layer, a portion on the silver chloride film where the zero-order diffracted light P is focused into the image is exposed to light, and hence the information is recorded on the silver film. Further, if the recording layer is formed of a thermosensitive medium, a magnet-optical medium or a phase change medium, the medium is changed thermally, magnet-optically or in phase due to heat generated by the zero-order diffracted light, so that information is recorded. It is recorded as a binary information. The binary information is formed by permitting and not permitting the light emitting elements to emit light. Since the intensity of first-order diffracted light Q is substantially less than about half of that of the zero-order diffracted light P, the information is not recorded by the first-order diffracted light Q.

3-3 Reading Operation

The reading operation is performed as follows. In the reading operation, all light emitting elements 23a of the light emitting element array 23 are allowed to emit the light. However, amount of current to be supplied, e.g., to the driving circuit 27 is reduced to half so that light emitting element array 23 can emit light with intensity which is almost half of the intensity in the recording operation. Accordingly, the information is not recorded on the information recording medium 50 by the zero-order diffracted light P or the first-order diffracted light Q due to light emission by the light emitting element 23a during the reading operation. In the reading operation, positional relation between the information recording medium 50 and the optical head 10a is controlled so that the first-order diffracted light Q emitted from the light emitting element form an image on the record bit position of the information recording medium 50, namely, on the positioning mark 57a of the information recording medium 50. The positional relation control is performed in the aforementioned 3-1 procedure.

FIG. 6 shows a state where the first-order diffracted light Q emitted from the light emitting element 23a is controlled to focus into the image on the record bit position of the information recording medium 50. The reflected light by the first-order diffracted light Q is lead to the light receiving element array 25. The light receiving element array 25 detects the reflected light of the first-order diffracted light Q and subjects it to light-electricity conversion. Amount of reflected light of the first-order diffracted light Q which focused into the image on the portion corresponding to the record bit position of the information recording medium 50 is differentiated depending on whether the information is recorded or not in the record bit position. Therefore, the light receiving element array 25 outputs different electric signals depending on whether the information is recorded or not on the record bit position. This electric signal passes through the light emitting element array amplifier 29 in FIG. 2, the preamplifier 67 and the signal processing unit 63 in FIG. 5, and then it is output from the signal processing unit 63 as a reading signal $S_{out}$.

As is evident from the aforementioned explanation, since the optical write/read device include the optical head wherein the light emitting element and the light receiving element corresponding to the number of tracks of the information recording medium are arranged so as to establish one to one correspondence with each track, the information comprising a plurality of bits can be recorded or read at a time without moving the optical head 10a in the direction crossing with the track direction of the information recording medium. Accordingly, a high speed access can be performed even if the feeding speed of the medium feeding mechanism is slow. Further, according to the preferred embodiment, since the light emitted from the light emitting element is split into the zero-order diffracted light and the first-order diffracted light by the diffraction grating so that the writing or recording operation is performed by the zero-order diffracted light and the reading or reading operation is performed by the reflected light of the first-order diffracted light, the light emitting element can be commonly used as the recording light source and the reading light source, and hence the recording optical system and the reading optical system are not necessary to be individually provided. The positional alignment of the information recording medium with respect to the optical head of the optical write/read device can be easily made using the information recording medium of the present embodiment.

According to the aforementioned embodiment, a so-called linear type optical write/read system where the information recording medium is fed linearly is explained. However, the present invention is applied to a so-called rotary type optical write/read system where the information recording medium is moved while it is rotated.

As mentioned in detail above, according to the present invention, the optical write/read device comprises the light emitting/receiving portion having the light emitting element array and the light receiving element array which are arranged in parallel with each other and the optical head having the simple optical system. In the optical system, the light emitted from the light emitting element is lead to the information recording medium and the light reflected on the information recording medium among the lights emitted from the light emitting elements is lead to the light receiving element. Accordingly, the light emitting elements can be commonly used as the recording light source and the reading light source, and the light receiving elements arranged in parallel with the light emitting elements can be used as the light detectors for reading information. The optical write/read device includes optical head units each provided for each of a plurality of track of the information recording medium. Accordingly, it is possible to realize the simple and low priced optical write/read device compared with the prior art optical write/read device.

The positional alignment of the information recording medium with respect to the optical write/read device can be easily performed since the information recording medium is employed by the optical write/read device.

What is claimed is:

1. In an optical write/read device having an optical head for writing information in and/or reading information from an information recording medium, said optical head comprises:

a light emitting/receiving portion comprising a plurality of light emitting elements arranged in one direction and a plurality of light receiving elements arranged in parallel with said light emitting elements to correspond to said plurality of light emitting elements; and an optical system for leading light emitted from said light emitting element to said information recording medium, and leading light reflected on said information recording medium among lights emitted from said light emitting elements to said light receiving elements.

2. The optical write/read device according to claim 1, wherein arranging directions of said light emitting elements and light receiving elements in said light emitting/receiving portion cross with a longitudinal direction of each track of said information recording medium.

3. The optical write/read device according to claim 2, wherein said light emitting elements and light receiving elements are provided with one to one correspondence with respect to each track of said information recording medium.

4. The optical write/read device according to claim 2, further comprising a head moving mechanism for moving at least said light emitting/receiving portion of said optical head with respect to said information recording medium.

5. The optical write/read device according to claim 4, wherein a moving direction of said light emitting/receiving portion by said head moving mechanism is the same as the arranging directions of said light emitting elements and light receiving elements.

6. The optical write/read device according to claim 5, wherein a moving distance of said light emitting/receiving portion by said optical head is within an arranging pitch of said light emitting elements.

7. The optical write/read device according to claim 1, wherein said light emitting/receiving portion outputs light having a single wavelength to said optical system.

8. The optical write/read device according to claim 7, wherein said optical system comprises a diffraction grating and a collimator lens.

9. The optical write/read device according to claim 1, further comprising a medium feeding mechanism for feeding said information recording medium with respect to said optical head.

10. The optical write/read device according to claim 9, wherein a feeding direction of said information recording medium by said medium feeding mechanism is the same as a longitudinal direction of each track of said information recording medium.

11. The information recording medium employed by said optical write/read device as described in claim 1, said information recording medium includes at least one positional aligning mark for positionally aligning the information recording medium with respect to said optical head.

12. The information recording medium employed by said optical write/read device as described in claim 1, said information recording medium includes at least one column of said positional aligning marks for positionally aligning the information recording medium with respect to said optical head, said positional aligning marks being arranged in a given pitch.

13. The information recording medium according to claim 12, wherein said at least one positional aligning mark column is provided along a track of said information recording medium.

14. The information recording medium according to claim 13, wherein said at least one positional aligning mark column is provided at one end of a recording portion of said information recording medium.

15. The information recording medium according to claim 13, wherein said at least one positional aligning mark column is provided at each end of a recording portion of said information recording medium, said recording portion having two ends.

16. The information recording medium according to claim 15, wherein positional aligning marks in one positional aligning mark column are staggered with respect to positional aligning marks in another positional aligning mark column.

* * * * *